US010448441B2

United States Patent
Yi et al.

(10) Patent No.: US 10,448,441 B2
(45) Date of Patent: Oct. 15, 2019

(54) METHOD FOR RECEIVING A PRIORITY FOR RELAY DATA IN A D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/739,033

(22) PCT Filed: Jul. 6, 2016

(86) PCT No.: PCT/KR2016/007328
§ 371 (c)(1),
(2) Date: Dec. 21, 2017

(87) PCT Pub. No.: WO2017/022958
PCT Pub. Date: Feb. 9, 2017

(65) Prior Publication Data
US 2018/0192457 A1 Jul. 5, 2018

Related U.S. Application Data

(60) Provisional application No. 62/201,596, filed on Aug. 6, 2015.

(51) Int. Cl.
*H04W 76/14* (2018.01)
*H04L 1/00* (2006.01)
(Continued)

(52) U.S. Cl.
CPC .............. *H04W 76/14* (2018.02); *H04L 1/00* (2013.01); *H04L 1/18* (2013.01); *H04L 5/0053* (2013.01);
(Continued)

(58) Field of Classification Search
CPC ......... H04W 1/00; H04W 1/18; H04W 29/08; H04W 28/02; H04W 88/04; H04W 76/14;
(Continued)

(56) References Cited

U.S. PATENT DOCUMENTS

2016/0381491 A1* 12/2016 Watfa ................... H04W 76/14
455/41.2
2017/0215160 A1* 7/2017 Lohr ................... H04W 56/002
(Continued)

OTHER PUBLICATIONS

Catt, "Resource Allocation for UE-to-Network relay operation," R1-152574, 3GPP TSG RAN WG1 Meeting #81, Fukuoka, Japan, May 25-29, 2015, 4 pages.
(Continued)

*Primary Examiner* — Jung Liu
(74) *Attorney, Agent, or Firm* — Birch, Stewart, Kolasch & Birch, LLP

(57) ABSTRACT

The present invention relates to a wireless communication system. More specifically, the present invention relates to a method and a device for receiving a priority in a D2D communication system, the method comprising: receiving an RRC signal for configuring a radio bearer for relay packet reception with a downlink logical channel priority for the radio bearer; and configuring the radio bearer corresponding to the downlink logical channel priority based on the RRC signal, wherein a relay packet received from the radio bearer is transmitted to a second UE based on the downlink logical channel priority.

12 Claims, 7 Drawing Sheets

(51) Int. Cl.
  *H04L 1/18* (2006.01)
  *H04L 29/08* (2006.01)
  *H04W 28/02* (2009.01)
  *H04W 88/04* (2009.01)
  *H04L 5/00* (2006.01)
  *H04W 4/70* (2018.01)
  *H04W 76/10* (2018.01)

(52) U.S. Cl.
  CPC .............. *H04L 29/08* (2013.01); *H04W 4/70* (2018.02); *H04W 28/02* (2013.01); *H04W 88/04* (2013.01); *H04L 1/1887* (2013.01); *H04L 1/1896* (2013.01); *H04W 76/10* (2018.02)

(58) Field of Classification Search
  CPC ... H04W 4/70; H04W 5/0053; H04W 1/1896; H04W 76/10; H04W 5/0035; H04W 5/0055; H04W 5/0057; H04W 12/2869; H04W 12/5695; H04W 47/00; H04W 47/70; H04W 47/78; H04W 47/821; H04W 47/827; H04W 72/04; H04W 1/1887
  See application file for complete search history.

(56) References Cited

U.S. PATENT DOCUMENTS

2017/0257876 A1* 9/2017 Loehr ................... H04L 5/0044
2018/0069618 A1* 3/2018 Loehr ................ H04B 7/15542

OTHER PUBLICATIONS

Catt, "Support for ProSe One-to-One Communication in Release 13," R2-152244, 3GPP TSG RAN WG2 Meeting #90, Fukuoka, Japan, May 25-29, 2015, pp. 1-3.

Huawei et al., "User plane procedures for UE to Network Relays," R2-152471, 3GPP TSG-RAN WG2 Meeting #90, Fukuoka, Japan, May 25-29, 2015, pp. 1-4.

QUALCOMM Incorporated, "Priority handling for Sidelink Direct Communication," R2-152575, 3GPP TSG-RAN WG2 Meeting #90, Fukuoka, Japan, May 25-29, 2015, 2 pages.

ZTE Corporation, "Priorities for ProSe communication," R2-152558, 3GPP TSG-RAN WG2 Meeting #90, Fukuoka, Japan, May 25-29, 2015, 2 pages.

* cited by examiner

[Fig. 1]
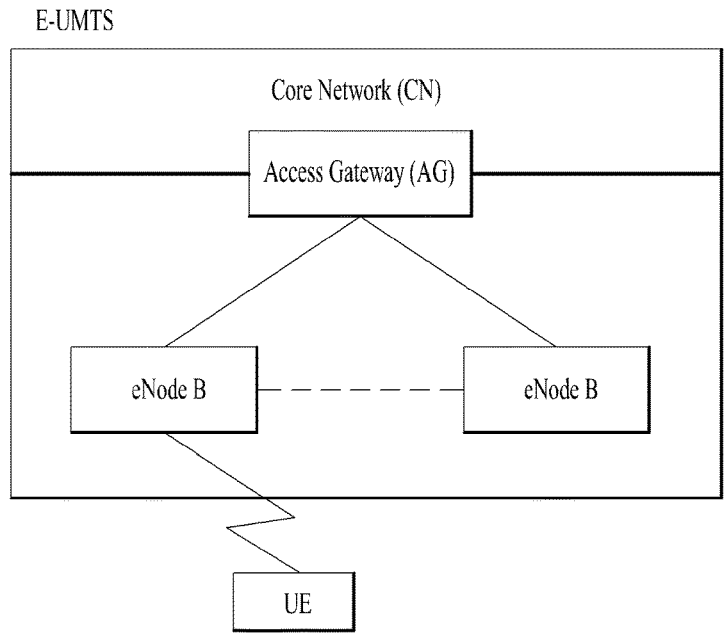
[Fig. 2A]
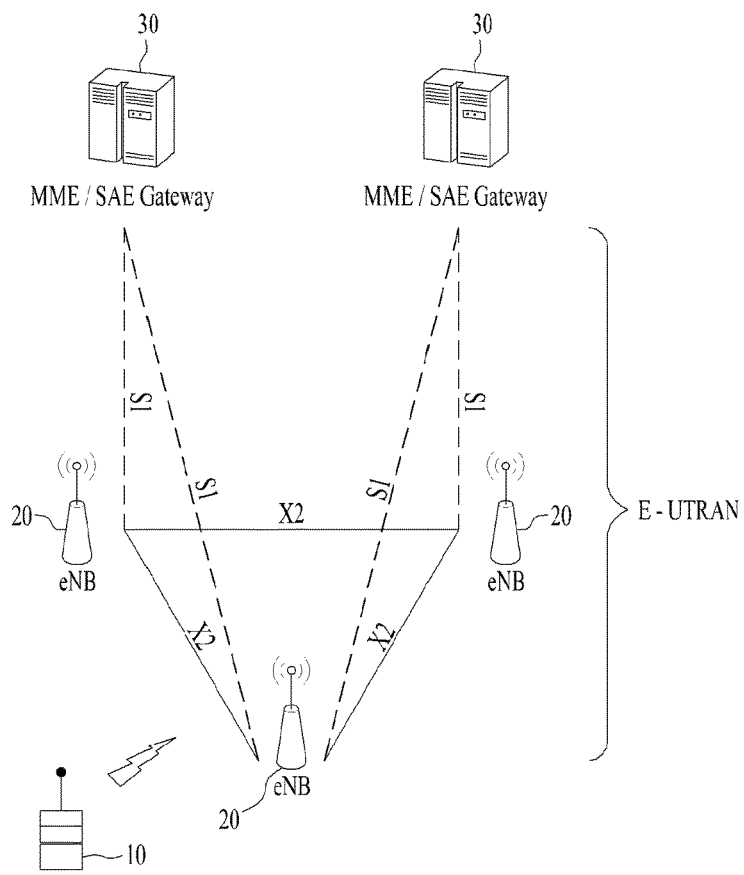

[Fig. 2B]
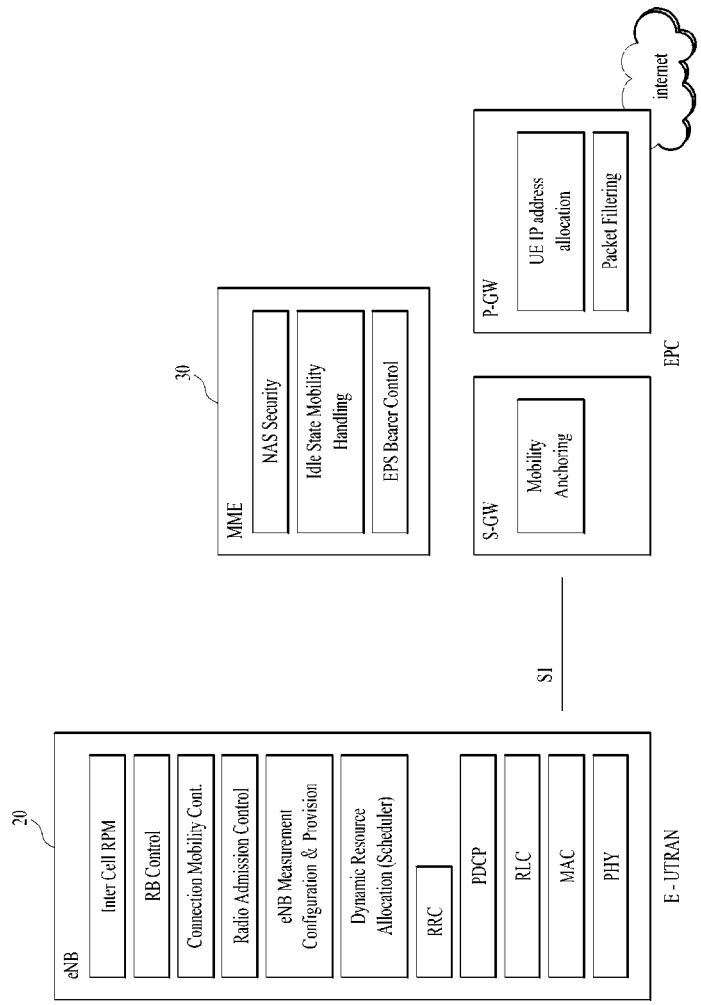

[Fig. 3]
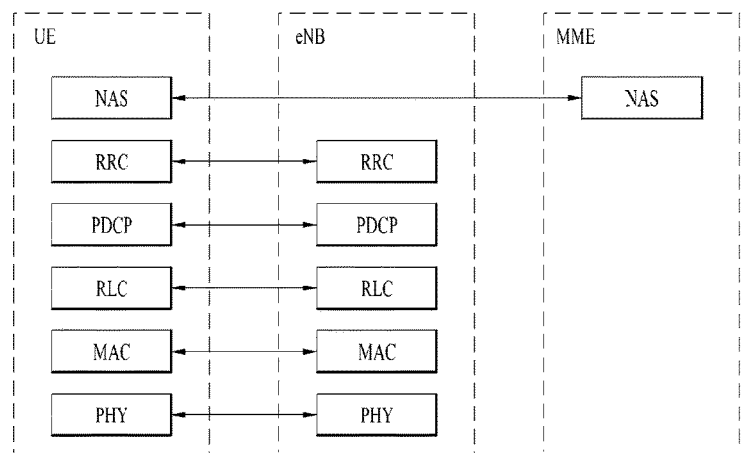
(a) Control-Plane Protocol Stack
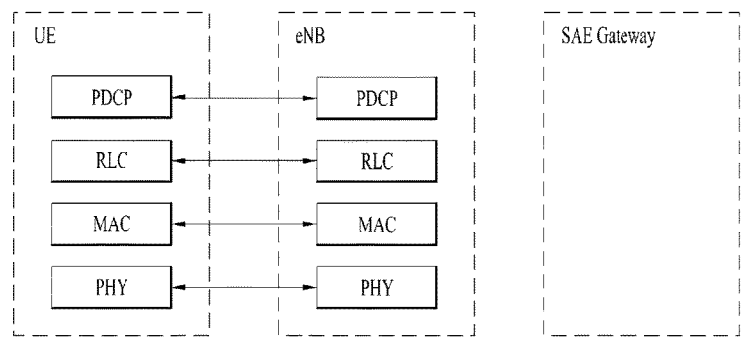
(b) User-Plane Protocol Stack
[Fig. 4]
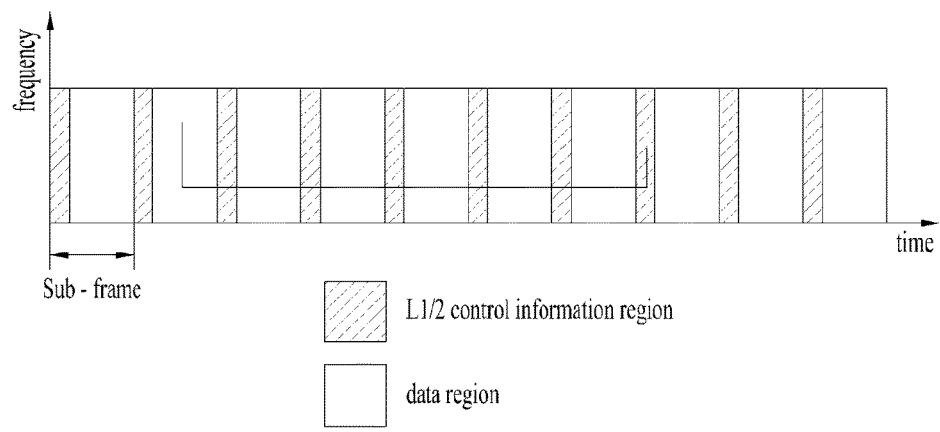

[Fig. 5]
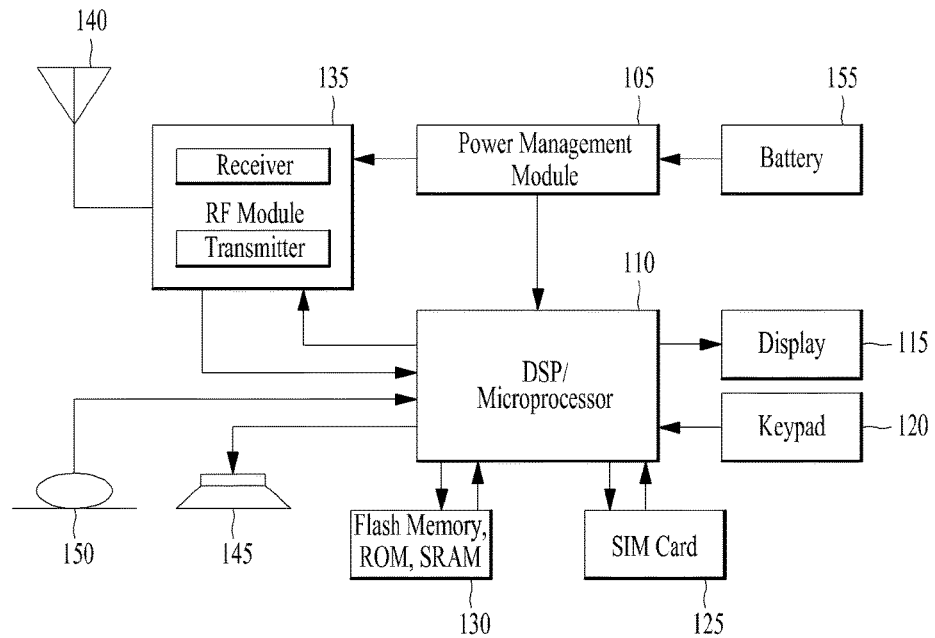
[Fig. 6]
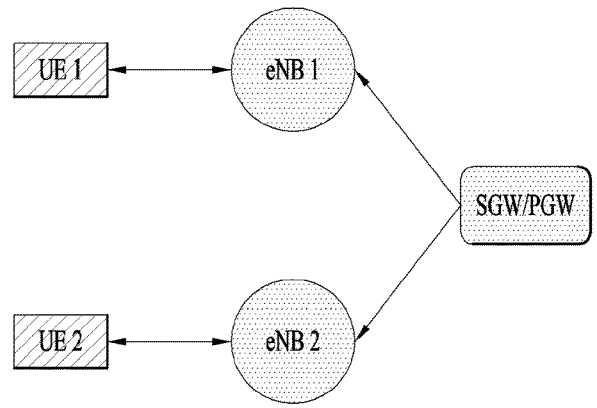
[Fig. 7]
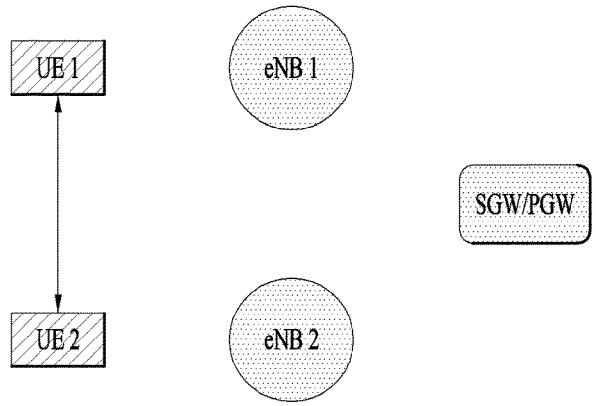

[Fig. 8]
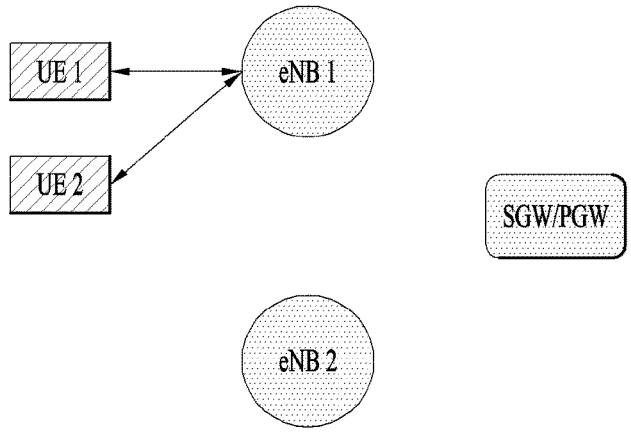
[Fig. 9]
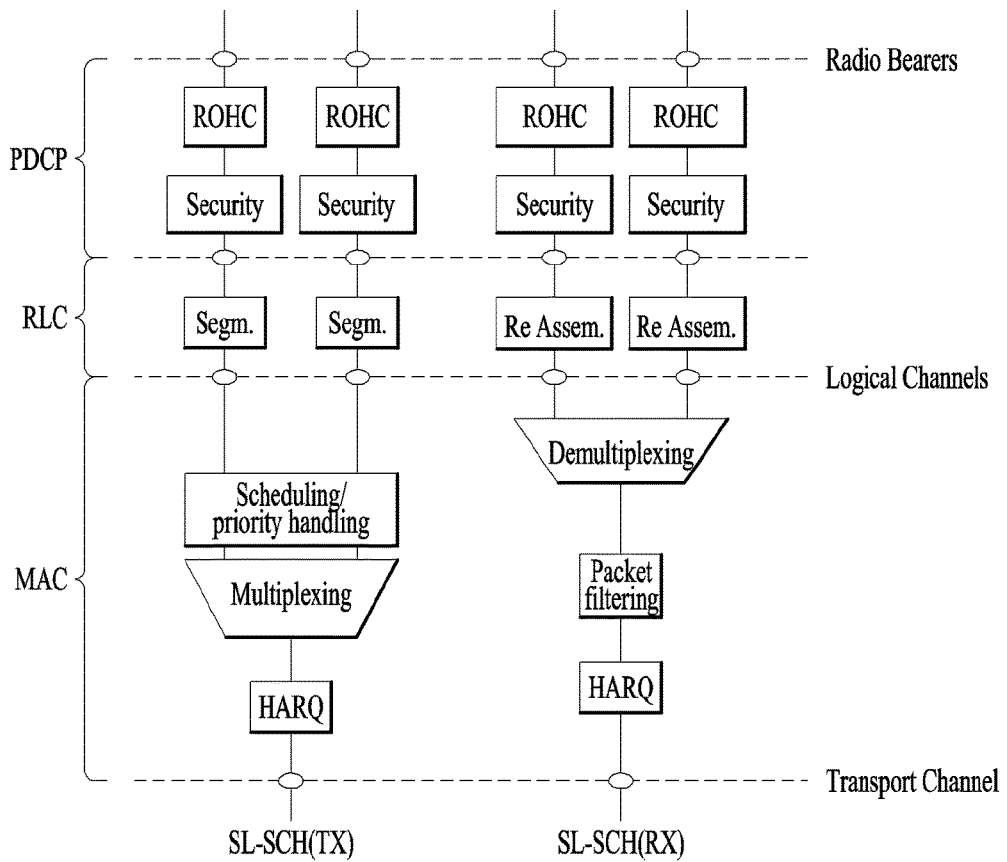

[Fig. 10A]
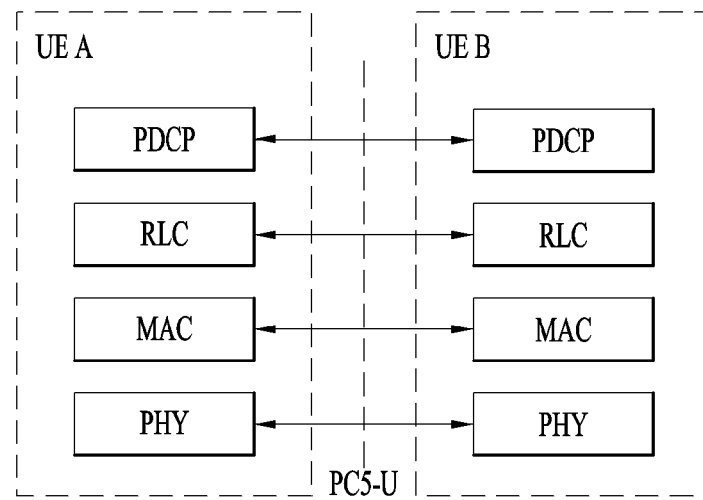
[Fig. 10B]
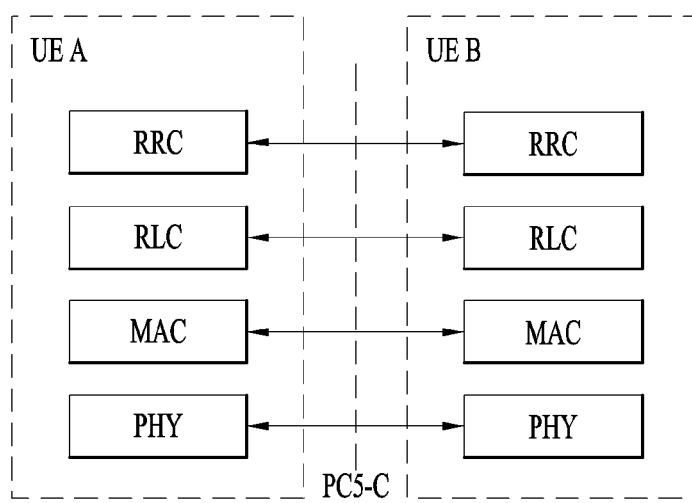

[Fig. 11]
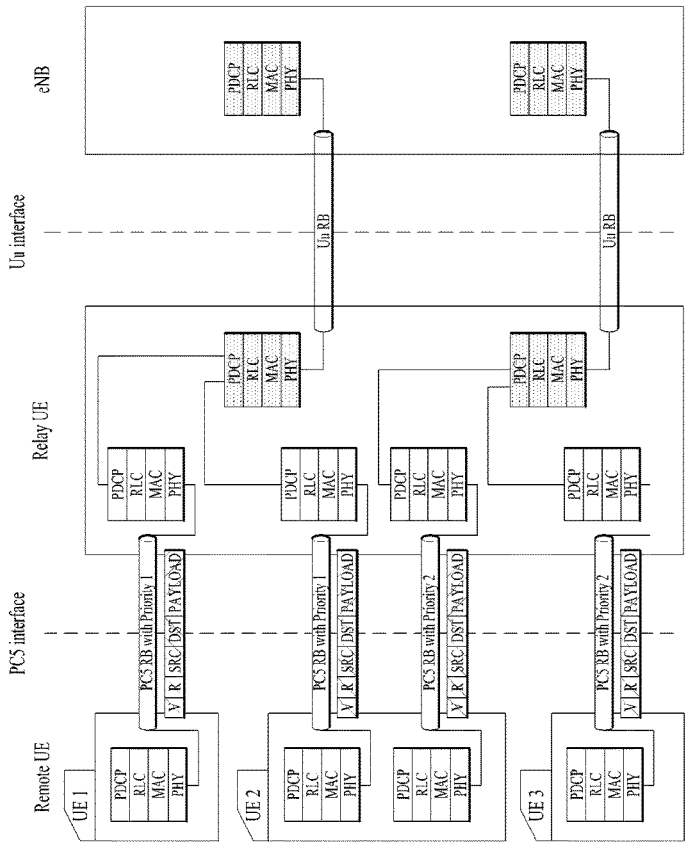
[Fig. 12]
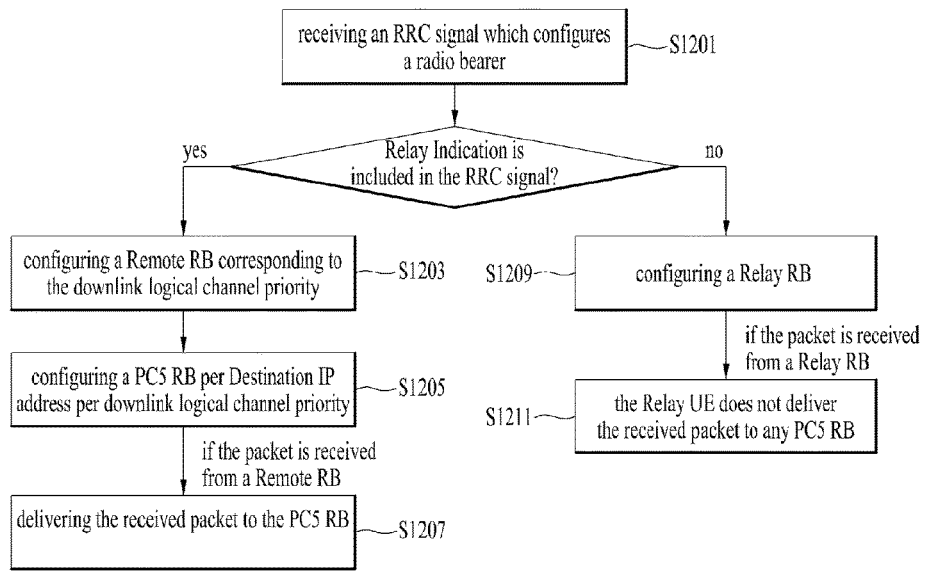

METHOD FOR RECEIVING A PRIORITY
FOR RELAY DATA IN A D2D
COMMUNICATION SYSTEM AND DEVICE
THEREFOR

CROSS REFERENCE TO RELATED APPLICATIONS

This application is the National Phase of PCT International Application No. PCT/KR2016/007328, filed on Jul. 6, 2016, which claims priority under 35 U.S.C. 119(e) to U.S. Provisional Application No. 62/201,596, filed on Aug. 6, 2015, all of which are hereby expressly incorporated by reference into the present application.

TECHNICAL FIELD

The present invention relates to a wireless communication system and, more particularly, to a method for receiving a priority for relay data in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for receiving a priority for relay data in a D2D communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In this invention, when an eNB configures a radio bearer for relay packet transmission from the eNB to the Relay UE, the eNB configures a downlink logical channel priority (DLCP) for the radio bearer.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is an example of default data path for a normal communication;

FIGS. 7 and 8 are examples of data path scenarios for a proximity communication;

FIG. 9 is a conceptual diagram illustrating for a Layer 2 Structure for Sidelink;

FIG. 10A is a conceptual diagram illustrating for User-Plane protocol stack for ProSe Direct Communication, and FIG. 10B is Control-Plane protocol stack for ProSe Direct Communication;

FIG. 11 is an example for PC5 interface between remote UEs and a relay UE; and

FIG. 12 is a diagram for receiving a priority for relay data in a D2D communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a Layer 2 structure for Sidelink.

Sidelink communication is a mode of communication whereby UEs can communicate with each other directly over the PC5 interface This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
  Uu transmission/reception (highest priority);
  PC5 sidelink communication transmission/reception;
  PC5 sidelink discovery announcement/monitoring (lowest priority).

FIG. 10A is a conceptual diagram illustrating for User-Plane protocol stack for ProSe Direct Communication, and FIG. 10B is Control-Plane protocol stack for ProSe Direct Communication.

FIG. 10A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10A.

User plane details of ProSe Direct Communication: i) there is no HARQ feedback for sidelink communication, ii) RLC UM is used for sidelink communication, iii) RLC UM is used for sidelink communication, iv) a receiving RLC UM entity used for sidelink communication does not need to be configured prior to reception of the first RLC UMD PDU, and v) ROHC Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the PPPP of protocol data unit transmitted over PC5 interface by higher layer. There is a PPPP associated with each logical channel.

SL-RNTI is an unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signaling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

FIG. 10B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 10B.

The PPPP is a ProSe Per-Packet Priority. The ProSe Per-Packet Priority is summarized as follows:

i) a single UE shall be able to transmit packets of different priorities on PC5, ii) the UE upper layers provide to the access stratum a ProSe Per Packet Priority from a range of possible values, iii) the ProSe Per Packet Priority is used to support preferential transmission of packets both intra-UE and across different UEs, iv) the support of 8 priority levels for the ProSe Per Packet Priority should be sufficient, v) the ProSe Per Packet Priority applies to all PC5 traffic, and vi) the ProSe Per Packet Priority is independent of the layer-2 destination of the transmission.

From the above summary, it seems that SA2 think ProSe packet prioritization based on PPP is very important and should be supported in PC5 interface in any case. Keeping this observation in mind, we explain how the LCP procedures should be changed from Rel-12.

FIG. 11 is an example for PC5 interface between remote UEs and a relay UE.

In ProSe, a UE communicates with other UEs directly over PC5 interface.

By introducing a Relay UE for UE-to-NW relay, a remote UE transmits data to an eNB via the Relay UE, and the eNB transmits data to the remote UE via the Relay UE. I.e., the Relay UE relays data to/from eNB.

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Over PC5 interface, Per-Packet Priority (PPP), is used to prioritize a certain packet, where the priority is independent with ProSe Group or ProSe UE. In order to prioritize the packet with higher priority over Uu interface as well, the Relay UE needs to know the priority of the packet so that the Relay UE provides more opportunities of transmission to the packet with higher priority.

Note that, currently the logical channel priority for a logical channel corresponding to the radio bearer is only available for the uplink and not for downlink.

For DL, the Relay UE obtains PPP information from the ProSe Uu RB, and uses this information to configure PC5 RB. The issue is how the Relay UE obtains the PPP information from the ProSe Uu RB.

The PPP to LCID mapping still does not work in Uu interface with the same reasons above as in PC5 interface. Therefore, including PPP information in the PDCP PDU should also be considered in Uu interface.

However, there is an implication in including PPP information in the PDCP PDU in Uu interface. The PDCP PDU format used in Uu interface does not have "SDU Type" field, so it is difficult to introduce an indicator in the PDCP PDU (unless utilizing "R" field", which has not been welcomed by RAN2).

In Uu interface, the use of a new PDU format has been indicated by RB configuration. Therefore, if RAN2 agrees to introduce a new PDCP PDU format including PPP information in Uu interface, it has to be indicated in RB configuration.

However, once the use of a new PDCP PDU format is indicated for a RB, all PDCP PDUs transmitted by the RB should use the new PDCP PDU format to include the same value of PPP. Then, it is questionable why the same PPP value should be included in all PDCP PDUs.

FIG. 12 is a diagram for receiving a priority for relay data in a D2D communication system according to embodiments of the present invention.

In this invention, when an eNB configures a radio bearer for relay packet transmission from the eNB to the Relay UE, the eNB configures a downlink logical channel priority (DLCP) for the radio bearer. The logical channel corresponding to the radio bearer over which the eNB transmits packets to the Relay UE is called as a downlink logical channel.

An eNB is communicating with a Relay UE over Uu interface. i.e., the eNB transmits packets to the Relay UE over Uu interface where the packets are either to be relayed to a remote UE by the Relay UE or to be targeted the Relay UE. The Relay UE is communicating with the remote UEs over PC5 interface, i.e., the Relay UE relays the packets received from the eNB to the remote UEs.

In this invention, relay packet transmission infers the packet transmission from the eNB to the remote UE via the Relay UE.

In this invention, the Uu RB is categorized into two types, Remote RB and Relay RB: the Remote RB is a radio bearer that transmits packets targeting to the remote UE relayed by the Relay UE, and the relay RB is a radio bearer that transmits packets targeting to the Relay UE.

The relay UE receives an RRC signal for configuring a Remote RB for relay packet reception with a downlink logical channel priority for the radio bearer (1201).

Preferably, the downlink logical channel priority is different from uplink logical channel priority. The downlink logical channel priority maps to the PPP (Per-Packet Priority) of the packets that are to be transmitted to the Remote UE relayed by the Relay UE.

There is one-to-one mapping between PPP and the downlink logical channel priority.

Preferably, the PPP is provided by the upper layer when the eNB receives the packet from the upper layer.

Preferably, the PPP is independent of the ProSe Group of the packet: the packets of the same ProSe Group can have different PPP and the packets of the different ProSe Groups can have the same PPP.

Preferably, the eNB and the Relay UE configure Remote RB per PPP. When configuring Remote RB per PPP, the eNB and Remote UE establish the PDCP/RLC entities per PPP. For different PPP, the eNB and Remote UE establish different PDCP/RLC entities.

In detail, when the eNB receives a packet with a PPP from the upper layer, the eNB considers the packet should be transmitted to the remote UE. In this case, the eNB configures a Remote RB if it is the first packet with the PPP. Otherwise, the eNB delivers the packet to the already established Remote RB for the PPP. The eNB configures the Remote RB to the Relay UE if it is the first packet with the PPP.

When the eNB configures a Remote RB to the Relay UE, the eNB sends a RRC signal including: i) a radio bearer identity, ii) a logical channel identity, iii) an indication (Relay Indication) indicates that the radio bearer is the Remote RB, and iv) the downlink logical channel priority.

Preferably, the Relay Indication may not be explicitly included. If the downlink logical channel priority is provided, it means that the radio bearer is the Remote RB. If the downlink logical channel priority is not provided, it means that the radio bearer is the Relay RB.

The eNB transmits the packets to the Remote RB via the Remote RB.

Anyway, when the Relay UE receives an RRC signal which configures a radio bearer (S1201), the Relay UE configures a Remote RB corresponding to the received downlink logical channel priority included in the RRC signal (S1203). The Relay UE considers that the packets received from the Remote RB should be relayed to the remote UE.

And the Relay UE configures a PC5 RB per Destination IP address per downlink logical channel priority (S1205). For each PC5 RB, the Relay UE establishes PDCP/RLC entities, and the Destination IP address identifies the target application of the target UE.

Preferably, the step S1201 is followed by the steps S1203, S1205 only if the Relay Indication is included in the RRC signal. When the Relay UE receives a packet from the eNB, the Relay UE delivers the received packet to the PC5 RB mapped to the downlink logical channel priority of the Remote RB and the Destination IP address of the received packet if the packet is received from a Remote RB (S1207).

If the Relay Indication is not included, the Relay UE configures a Relay RB (S1209). In this case, the Relay UE considers that the packets received from the eNB over the radio bearer is targeted the Relay UE and shall not be relayed to the remote UE.

If the packet is received from a Relay RB, the Relay UE considers that the received packet is targeted to the Relay UE itself, and the Relay UE does not deliver the received packet to any PC5 RB (S1211).

In conclusion, for DL, rather than introducing a new PDCP PDU format, it is more efficient to indicate PPP information in RB configuration in Uu interface. The Relay UE associates the PPP with each PDCP PDU received from the RB, and uses this PPP information when transmitting relayed packets to the Remote UE.

Thus, when the UE receives logical channel configuration information via an RRC signal, the UE can obtain information the downlink logical channel priority for the radio bearer as well as uplink logical channel priority for the radio bearer. The downlink logical channel priority for the radio bearer is associated with PPP of the packets that are to be transmitted to the Remote UE relayed by the Relay UE. So, the UE can relay the relay packet using the downlink logical channel priority according to the invention.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a first user equipment (UE) operating in a wireless communication system, the method comprising:
receiving a radio resource control (RRC) signal from an evolved Node B (eNB) for configuring a radio bearer for relay packet reception with a downlink logical channel priority for the radio bearer; and
configuring the radio bearer corresponding to the downlink logical channel priority based on the RRC signal,
wherein a relay packet received from the radio bearer is transmitted to a second UE based on the downlink logical channel priority, and
wherein the downlink logical channel priority is for prioritizing the radio bearer over which the eNB transmits the relay packet to the first UE.

2. The method according to claim 1, further comprising:
configuring a PC5 radio bearer based on the downlink logical channel priority, wherein the PC5 radio bearer is configured per destination Internet Protocol (IP) address per the downlink logical channel priority; and
transmitting the relay packet to the second UE identified by the destination IP address via the PC5 radio bearer mapped to the downlink logical channel priority.

3. The method according to claim 1, wherein the RRC signal further includes an indication indicating that the radio bearer is for transmitting relay packets targeted to the second UE relayed by the first UE.

4. The method according to claim 1, wherein when the radio bearer is configured per the downlink logical channel priority, Packet Data Convergence Protocol (PDCP) and Radio Link Control (RLC) entities are established per the downlink logical channel priority.

5. The method according to claim 1, wherein the downlink logical channel priority has one-to-one correspondence to Per-Packet Priorities (PPPs) of a packet that is to be transmitted to the second UE relayed by the first UE.

6. The method according to claim 1, wherein the downlink logical channel priority for the radio bearer is received when the first UE receives configuration information for logical channels for the radio bearer.

7. A first User Equipment (UE) operating in a wireless communication system, the first UE comprising:
a transceiver; and
a processor operably coupled with the transceiver and configured to:
control the transceiver to receive a radio resource control (RRC) signal from an evolved Node B (eNB) for configuring a radio bearer for relay packet reception with a downlink logical channel priority for the radio bearer, and
configure the radio bearer corresponding to the downlink logical channel priority based on the RRC signal,
wherein a relay packet received from the radio bearer is transmitted to a second UE based on the downlink logical channel priority, and
wherein the downlink logical channel priority is for prioritizing the radio bearer over which the eNB transmits the relay packet to the first UE.

8. The first UE according to claim 7, wherein the processor is further configured to:
configure a PC5 radio bearer based on the downlink logical channel priority, wherein the PC5 radio bearer is configured per destination Internet Protocol (IP) address per the downlink logical channel priority, and
transmit the relay packet to the second UE identified by the destination IP address via the PC5 radio bearer mapped to the downlink logical channel priority.

9. The first UE according to claim 7, wherein the RRC signal further includes an indication indicating that the radio bearer is for transmitting relay packets targeted to the second UE relayed by the first UE.

10. The first UE according to claim 7, wherein when the radio bearer is configured per the downlink logical channel priority, Packet Data Convergence Protocol (PDCP) and Radio Link Control (RLC) entities are established per the downlink logical channel priority.

11. The first UE according to claim 7, wherein the downlink logical channel priority has one-to-one correspondence to Per-Packet Priorities (PPPs) of a packet that is to be transmitted to the second UE relayed by the first UE.

12. The first UE according to claim 7, wherein the downlink logical channel priority for the radio bearer is received when the first UE receives configuration information for logical channels for the radio bearer.

* * * * *